(12) United States Patent
Aboujaoude et al.

(10) Patent No.: US 7,957,462 B2
(45) Date of Patent: Jun. 7, 2011

(54) INTEGRATED COMPACT EYE PATTERN ANALYZER FOR NEXT GENERATION NETWORKS

(75) Inventors: Ramzi Aboujaoude, San Jose, CA (US); Kyle Brian Stickle, San Jose, CA (US)

(73) Assignee: Anritsu Company, Morgan Hill, CA (US)

( * ) Notice: Subject to any disclaimer, the term of this patent is extended or adjusted under 35 U.S.C. 154(b) by 726 days.

(21) Appl. No.: 11/963,233

(22) Filed: Dec. 21, 2007

(65) Prior Publication Data
US 2009/0161743 A1 Jun. 25, 2009

(51) Int. Cl.
H04B 3/46 (2006.01)
H04B 10/00 (2006.01)

(52) U.S. Cl. ....................................... 375/226; 398/115

(58) Field of Classification Search .................. 375/226, 375/130; 398/115, 155, 716; 702/66, 70, 702/176
See application file for complete search history.

(56) References Cited

U.S. PATENT DOCUMENTS

| 2004/0186673 A1* | 9/2004 | Agoston et al. | 702/70 |
| 2008/0170859 A1* | 7/2008 | Reyna et al. | 398/115 |
| 2009/0219395 A1* | 9/2009 | Baker et al. | 348/180 |

* cited by examiner

Primary Examiner — Khai Tran
(74) Attorney, Agent, or Firm — Fliesler Meyer LLP (57) ABSTRACT

A portable hand-held battery powered eye pattern analyzer is provided that can analyze signal quality of a high speed digital communication network. The system is 10 times smaller in volume and 4 times lighter than the bench-top equivalent instruments. The system includes a housing containing a display, keypad, power supply, battery pack, and RF sampler board along with connections for electrical inputs, optical inputs, clock signal inputs, and clock recovery signal inputs. The sampler circuit board can support connections, such as a USB plug for attachment to a personal computer. The RF sampler board contains the following elements: (1) A dual sampler for two-channel electrical inputs. (2) An Optical-to-Electrical O/E conversion module. (3) A clock recovery unit (CRU) module to recover the clock from the electrical or optical pulse pattern signal. (4) A trigger circuit that accepts an input clock and uses that clock to trigger the sampling of the data signal. (5) A PRBS generator that could be used as stimulus for testing high speed devices, and (6) A controller such as an FPGA that processes the sampled signals and provides statistical analysis along with eye patterns to a display as controlled using the keyboard.

20 Claims, 9 Drawing Sheets

| 505 |
|---|
| Time |
| Data Rate<br>10000 Gbps | — 510 |
| Divide Ratio<br>1 | — 511 |
| Clock Rate<br>10,000 GHz | — 512 |
| Acquire Clock<br>Rate | — 513 |
| Unit<br><u>UI</u>   ps | — 514 |
| Bits<br>2 | — 515 |
| Offset<br>0.00 | — 516 |
| Pattern Length<br>32 | — 517 |

FIG. 13

| 605 |
|---|
| Amplitude |
| Channel 1<br><u>Elect</u>  Opt  Off | — 610 |
| Scale<br>250.0 mV | — 611 |
| Offset<br>25.0 mV | — 612 |
| Attenuation<br>0.0 dB | — 613 |
| Channel 2<br><u>Elect</u>  Opt  Off | — 614 |
| Scale<br>125.0 mV | — 615 |
| Offset<br>-25.0 mV | — 616 |
| Attenuation<br>0.0 dB | — 617 |

FIG. 14

| 705 |
|---|
| Marker |
| Active Channel<br><u>CH1</u>   CH2 | — 710 |
| X1<br>On   <u>Off</u> | — 711 |
| X2<br>On   <u>Off</u> | — 712 |
| Y1<br>On   <u>Off</u> | — 713 |
| Y2<br>On   <u>Off</u> | — 714 |
| Center<br>Markers | — 715 |
| All Markers<br>Off | — 716 |

FIG. 15

INTEGRATED COMPACT EYE PATTERN ANALYZER FOR NEXT GENERATION NETWORKS

BACKGROUND

1. Technical Field

The present invention relates to an analyzer for testing the quality of high frequency digital signals. More particularly, the present invention relates to an eye pattern analyzer for assessing the integrity of the high data rate signals at the physical layer of a network.

2. Related Art

Fueled by the growth of the internet, Next Generation Networks (NGN) are being rapidly deployed to keep up with the demands of multimedia and high-speed data communications.

Eye patterns or eye diagrams are invaluable tools in accessing the integrity of high data rate signals at the physical layer of the network. The eye pattern is formed by superimposed zeros and ones of a digital signal. The characteristics of the eye pattern can be analyzed statistically to determine signal quality.

Eye pattern measurements can be done with an oscilloscope combined with other components. To generate a single eye pattern of a high speed signal with an oscilloscope, one would need to configure an oscilloscope chassis with the proper electrical sampling head module as well as an Optical-to-Electrical (O/E) conversion module, or a Clock Recovery Unit (CRU) module if necessary, and processing equipment to perform a statistical analysis. The resulting setup is costly, bulky, and complex.

Eye pattern measurements can also be made with complex time sampling oscilloscopes such as the Agilent 86100 DCA or Tektronix DSA8200 which are highly configurable and sophisticated instruments. Furthermore, specialized equipment such as the BertScope from SyntheSys Research can be used. These instruments tend to be sophisticated, expensive, heavy, bulky, and don't lend themselves to ease of use or portability.

Thus, it is desirable to provide an eye pattern analyzer for assessing the integrity of data that offers advantages over either a standard sampling oscilloscope, or a sophisticated eye pattern analyzer instrument.

SUMMARY

According to embodiments of the present invention, a portable, integrated, easy-to-use, low cost eye pattern analyzer is provided that can be used during deployment or maintenance of equipment in a high speed digital communication network by an end user. The eye pattern analyzer can be implemented in different packages (handheld, benchtop, modular) depending on the target applications.

Embodiments of the present invention present an integrated solution that contains the appropriate signal samplers, O/E module, CRU modules, and processing to perform statistical analysis for eye patterns targeting the Next Generation Networks. In addition, a Pseudo Random Binary Sequence (PRBS) generator can be integrated in the module to provide a test signal for high speed devices. Embodiments of the present invention will be referred to as the Eye Pattern Analyzer.

The system in one embodiment includes a housing containing a display, keypad, power supply, battery pack, and RF sampler board along with connections for electrical inputs, optical inputs, clock signal inputs, and clock recovery signal inputs. The sampler circuit board can support connections, such as a USB plug for attachment to a personal computer. The heart of the system is the RF sampler board containing the following elements:

(1) A dual sampler for two-channel electrical inputs.
(2) An O/E module.
(3) A CRU module to recover the clock from the electrical or optical pulse pattern signal. This clock is used to trigger the sampling of the data signal.
(4) A trigger circuit that accepts an input clock and uses that clock to trigger the sampling of the data signal.
(5) A PRBS generator that could be used as stimulus for testing high speed devices; and
(6) A controller which processes the signals and provides statistical analysis along with eye patterns to a display. The controller can be an FPGA, a digital signal processor, microprocessor, or other application specific integrated circuit.

In one embodiment, the eye pattern analyzer is housed in a light-weight battery-operated hand-held package, which can be at least 10 times smaller in volume and 4 times lighter than the bench-top equivalent instruments. The housing package contains all the elements needed to perform eye pattern analysis on high speed signals that can range up to 12.5 Gbps or higher.

In the handheld eye pattern analyzer, the RF sampler board interfaces to a display, a keypad, and can interface with a separate CPU board. The instrument displays the eye pattern and makes statistical measurements on the resulting data. In addition to displaying eye patterns, this instrument can display the pulse pattern of the data stream to allow the user to determine the source of any eye closures. The interface can provide a controller link to a graphical user interface (GUI) on the display that can be accessed by the keypad. The instrument can be powered by AC power or by battery.

BRIEF DESCRIPTION OF THE DRAWINGS

Further details of the present invention are explained with the help of the attached drawings in which.

DETAILED DESCRIPTION

I. System Description

Figure 1:
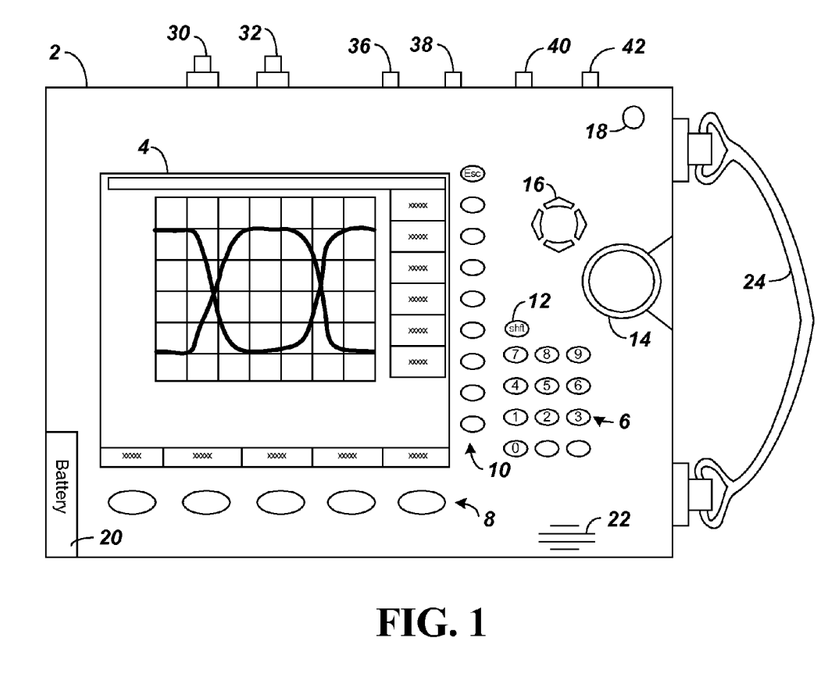
FIG. 1 shows a front view of one embodiment of a housing for the eye pattern analyzer.

FIG. 1 shows a front view of one embodiment of a housing 2 for the eye pattern analyzer. The housing includes a display 4 and number keypad 6. The keypad further includes hard function keys 8. The hard function keys 8 set measurement parameters for the display graph and have functions shown on the screen above the keys 8 as described in more detail to follow. The housing further includes soft function keys 10. The soft function keys 10, like the hard keys 8, have functions that are displayed on the adjacent screen. The soft function keys 16 can have their functions changed using at least the shift key 12. A rotary knob 14 allows incremental scrolling of setting values and selection of markers on the display. The rotary knob can further be depressed to lock a selection. Similarly up, down, left and right keys 16 allow movement of markers and scrolling of values on the display screen 4. Battery and charge LED indicators 18 allow monitoring the power supply.

The housing 2 further includes a compartment 20 for a rechargeable battery. A fan outlet 22 allows for cooling of the power supply, as well as any internal components that generate considerable heat. Handle 24 allows the housing to be handheld and easily portable.

Figure 2:
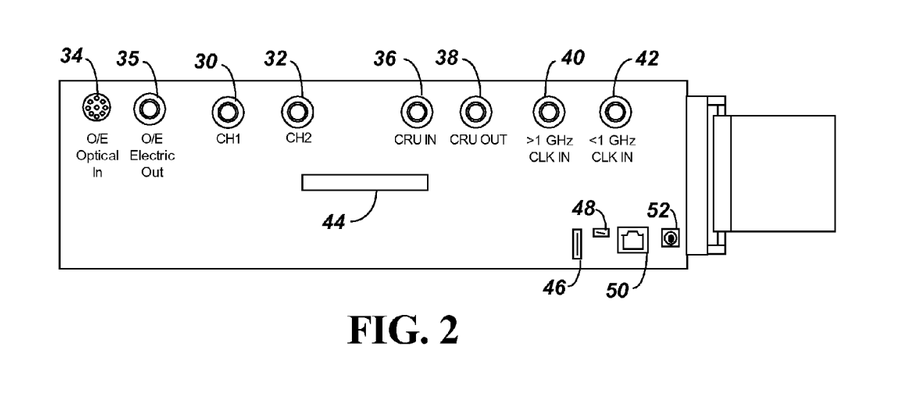
FIG. 2 shows a top view of the housing for the eye pattern analyzer.

FIG. 2 shows a top view of the housing for the eye pattern analyzer. The top view of FIG. 2, as well as the front view of FIG. 1, illustrates connection ports for external components. The housing has two electrical signal connection ports 30 and 32, labeled channel 1 (CH1) and channel 2 (CH2.) The housing further has an O/E optical input connection port 34 to connect an optical cable providing an input. An O/E optical output 35 provides the optical input signal after conversion to electric. A clock recovery unit (CRU) input CRU IN 36 allows connection of an electrical signal from which a clock signal can be recovered. The recovered clock signal from the CRU IN port 36 is provided at the CRU OUT port 38. Two additional clock signal port connections 40 and 42 are included when connection of a reference clock signal is available. A first clock port (>1 GHz CLK IN) 40 receives signals greater than 1 GHz. A second clock port (<1 GHz CLK IN) 42 receives signals less than 1 GHz. In some embodiments, the clock input ports can be combined into one input port that covers all the clock frequency ranges.

The housing 2, as shown in FIG. 2, further includes a connection socket port 44 for a compact flash card. Other connections include a USB Type-An interface 46, a USB Type-B interface 48, and a LAN connection port 50. The housing further has a power supply connection port 52 for connection to power the system or charge the battery. In some embodiments power port 52 can be used to connect power from the battery in housing 2 to power an external device.

Figure 3:
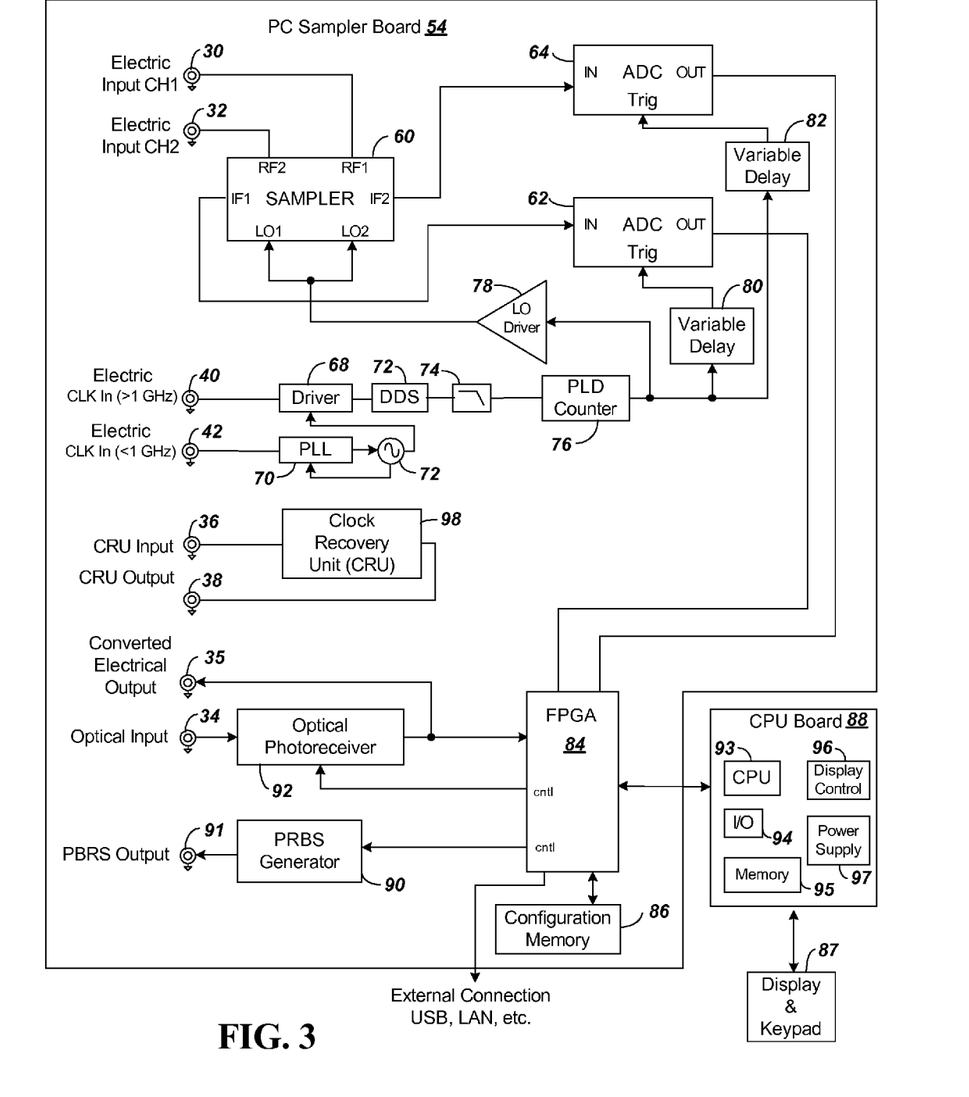
FIG. 3 shows circuitry for an embodiment of an RF sampler board that can be included in the housing.

FIG. 3 shows circuit components for one embodiment of an RF sampler board 54 that can be included in the housing 2. In FIG. 3, the input port connections carried over from FIGS. 1 and 2 are similarly labeled, as will be connections and components carried over in subsequent drawings. Initially, the RF sampler board includes sampler 60. The sampler 60 is a dual sampler with two RF input ports connected to the respective electric input CH1 30 and the electric input CH2 32. Sampler 60 in one embodiment is a 25 GHz device. IF outputs of the sampler provide signals to analog to digital converters (ADC) 62 and 64. The LO inputs are provided from a common trigger circuit. Note that although a dual sampler is shown, a single port sampler might likewise be used in some embodiments.

The trigger circuit includes a driver 68 connected to the first electric clock CLK IN 40 that provides a greater than 1 GHz signal. A low frequency clock less than 1 GHz is provided through a phase locked loop (PLL) 70 that can control oscillator 72 to modulate the clock to a higher frequency to provide to the driver 68. The output of driver 68 is connected through a Direct Digital Synthesizer (DDS) 72 and a low-pass filter 74 and to a counter 76. In one embodiment the DDS is a 1 GHz device from Analog Devices that enables the trigger circuit to be compact and low power. One limitation of the DDS 72 is that triggering can only be applied on a clock signal, so in some embodiments the DDS 72 is not used. The counter 76 can be formed from a programmable logic device (PLD) to be programmable to trigger sampling at a desired frequency depending on the clock input. The output of counter 76 is provided through an LO driver 78 to the LO inputs of sampler 60. The output of the counter 76 is also provided through variable delay devices 80 and 82 to trigger the ADCs 62 and 64. The outputs of the ADCs 62 and 64 then provide digital signals to an FPGA 84. Although an FPGA 84 is shown, other component, such as a microprocessor, application specific integrated circuit (ASIC), digital signal processor, or other similar circuit could be used.

The FPGA 84 performs two main functions. The first function is to control all the hardware on the RF sampler board 54. The second function is to process all the data generated by the RF sampler board 54. The FPGA 84 uses the sampled signal inputs to create eye patterns, and to provide statistical analysis of the eye patterns. In addition, the FPGA 84 provides a connection between the RF sampler board 54 and a Central Processing Unit (CPU) board 88. Although CPU board 88 is shown, a personal computer might likewise be used. Further, some of the CPU board 88 components could be included in the FPGA. Further, although shown on a separate CPU board 88, the components of the CPU board 88 can be included on the sampling board 54. As shown, the CPU board 88 can include a CPU 93, I/O buffers 94, memory 95, display control 96 and power supply 97. The CPU board 88 provides an interface to the display and keypad 87, or other user interface devices (not shown), such as USB and LAN ports, as shown in FIG. 2. The FPGA 84 is connected to a configuration memory 86 that can be programmed to control the FPGA 84. Either the FPGA 84 and/or separate processor board 88 can be used to provide a statistical analysis on received signals and then provide the results for display. The display can be used to provide a user keyboard interface with a graphical user interface (GUI).

The FPGA 84 further provides control signals to operate the PRBS generator 90 and the optical photoreceiver 92. The PRBS generator 90, although shown as a separate device, can be included in the FPGA 84. The PRBS generator 90 connects to the PRBS output 91 to provide a stimulus signal to an external device generating an electrical signal being tested. The FPGA 84 can monitor the digital signals being received and control the operation of the PRBS generator 90 to enable full loop testing.

The photoreceiver 92 receives an input from the O/E input port 34 and converts the signal to an electrical signal that is output at port 34. The O/E module photoreceiver 92 can cover multiple optical wavelengths (850 nm to 1550 nm). To test the eye pattern of the optical signal, the signal is routed to the optical input port 34 and the converted electrical output is routed via an external cable from port 35 to either one of the electrical inputs CH1 30 or CH2 32. In one embodiment of the invention an internal switch connects port 35 to one of ports 30 or 32 as controlled by FPGA 84. The FPGA 84 provides control signals to enable the optical to electrical conversion in photoreceiver 92, and monitors its outputs.

The sampler board of FIG. 3 further includes clock recovery unit (CRU) 98. If a synchronization clock is not available to connect to one of ports 40 or 42, the CRU 48 allows a clock to be recovered from the incoming electrical signal applied to CRU input port 36. The CRU 98 can include a wide-band 8-12.5 GHz voltage controlled oscillator (VCO) available from Hittite allowing the CRU to be compact and low power. A drawback to using a VCO is that the CRU is not as wideband as a YIG-based oscillator and may not be able to lock onto burst data signals as easily. The recovered clock from CRU 98 is provided to CRU output 38. To trigger the sampler 60 using the recovered clock, the CRU output 38 is connected using an external cable to one of the CLK In ports 40 or 42. In one embodiment an internal switch connects port 38 to one of ports 40 or 42.

Note that although the components of FIG. 3 are described as being provided on a single sampling board, it is understood that more than one PC board can be used to support separate ones of the circuit components. It is further understood that some of the components can remain outside the housing 2 if normal test conditions do not require these components.

II. DUT Connections

Figure 4:
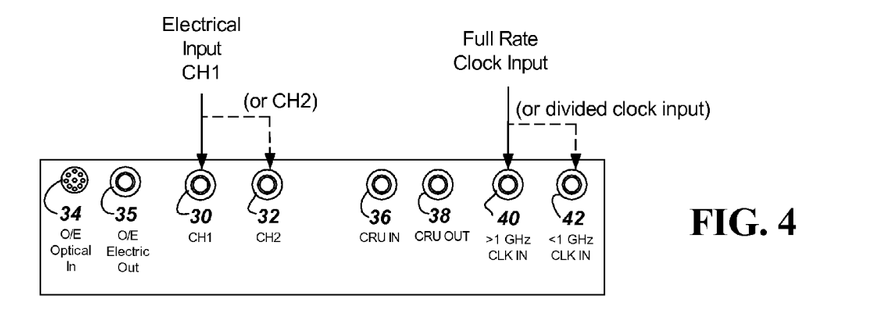
FIGS. 4-7 illustrate connections to ports of the eye pattern analyzer housing for different device under test (DUT) test configurations.

FIGS. 4-7 illustrate connections to ports of the eye pattern analyzer housing for different device under test (DUT) test configurations. FIG. 4 shows a standard connection with an available electrical signal and a reference clock input. As shown, the electrical input is connected to CH1 port 30. Alternatively the CH2 port 32 can be used as shown by the dashed line. The full rate clock input is provided to the CLK In input 40, although dashed lines show a divided or lower frequency clock can be connected to CLK in port 42.

Figure 5:
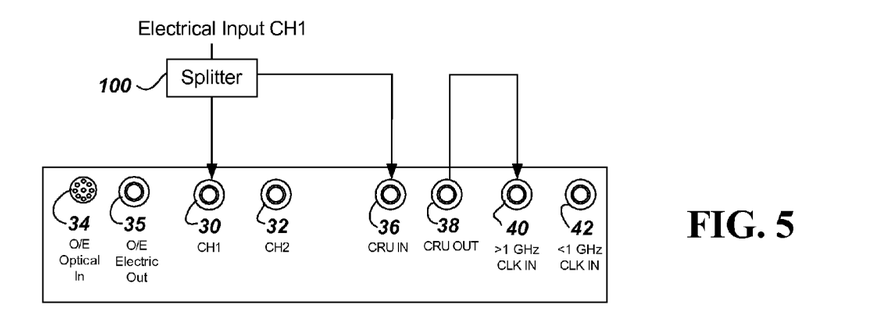

FIG. 5 shows connection when an electrical signal is available without a clock reference. As shown, a splitter 100 is used to receive the electrical input and provide one output to one of ports CH1 30 or CH2 32. A second output of splitter 100 connects to the clock recovery unit CRU input 36 to enable clock recovery. The CRU output 38 is then connected by a cable to one of the electrical CLK In ports 40 or 42.

Figure 6:
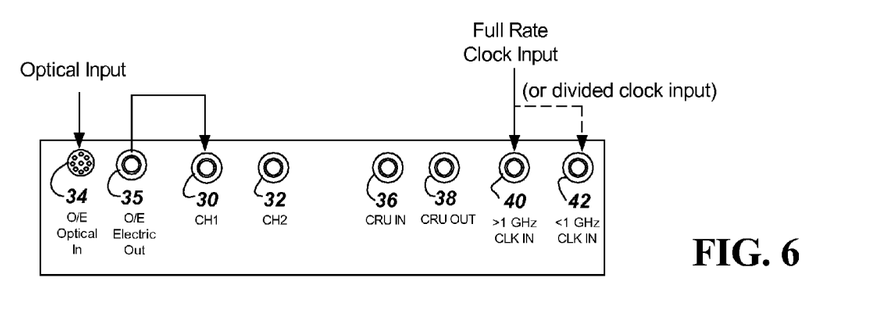

FIG. 6 illustrates connection of a DUT that has an optical output with a reference clock available. The optical cable input is connected to optical input 34. The converted electrical output will then be provided at port 35. A cable is then used to connect the converted optical port 35 to one of the CH1 30 or CH2 32 electrical input ports 30 or 32 for testing. The electric reference clock signal is then connected to one of the electric CLK In ports 40 or 42 for triggering sampling. Note that in an embodiment that does not include an optical to electrical module inside the eye pattern analyzer, a separate external electrical to optical conversion module can be used to convert the optical signal and provide an electrical signal to one of ports CH1 30 or CH2 32. Power can be provided to the external optical conversion module from a power connection to the battery of the eye pattern analyzer in one embodiment.

Figure 7:
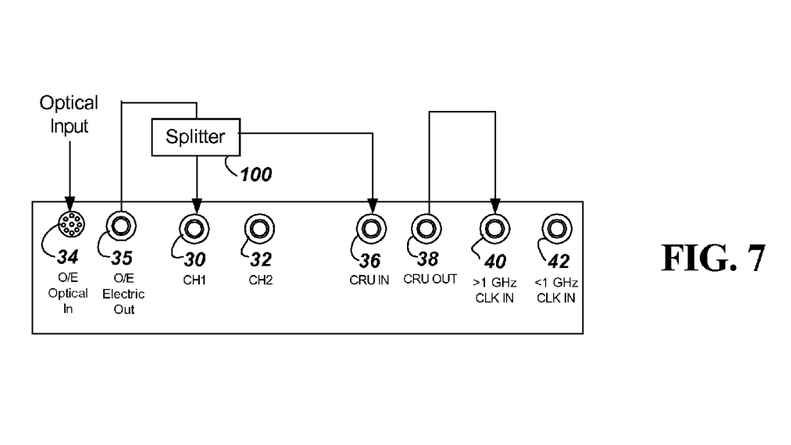

FIG. 7 illustrates connection of a DUT that has an optical output without a reference clock available. As in FIG. 6, the optical cable is connected to optical input 34. The converted electrical output 35, however is provided to an input of splitter 100. A first output of splitter 100 then goes to electrical port CH1 30, while a second input goes to the CRU input 36. The CRU output 38 then provides a recovered clock through a cable connection to CLK In port 40.

Figure 8:
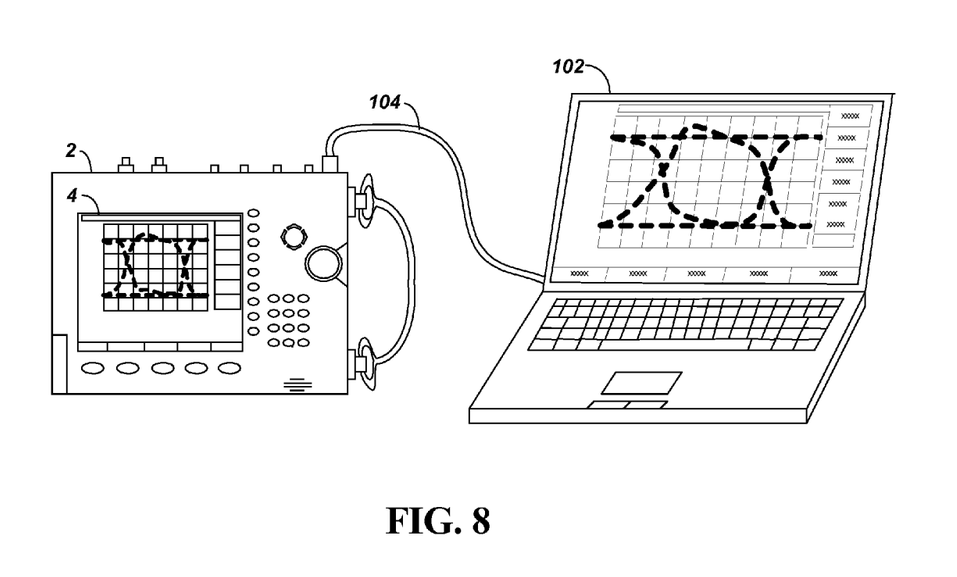
FIG. 8 illustrates connection of an eye pattern analyzer to a personal computer.

FIG. 8 illustrates connection of an eye pattern analyzer housing 2 to a laptop personal computer 102. The laptop PC 102 can be connected by the USB cable 104 shown, or another connection such as a LAN cable. The laptop PC 102 can be connected directly to the RF sampler board 54, or to the internal CPU board 88 that is located inside the eye pattern analyzer housing 2 as shown in FIG. 3. The laptop PC can further be used instead of the CPU board 88. The laptop PC 102 enables a larger display than the display 4 in the housing 2. Further, the keyboard of the personal computer 102 can take over the function of at a least a portion of the keypad on the housing. The PC can further enable reprogramming of the FPGA in the eye pattern analyzer, or can provide increased processing power to provide further statistical analysis in addition to those provided by the FPGA.

Figure 9:
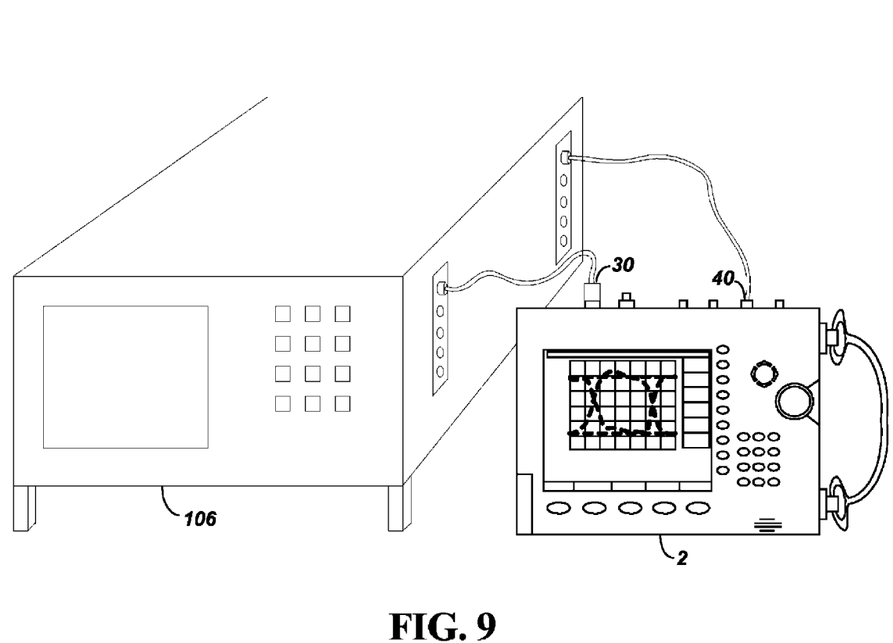
FIG. 9 illustrates connection of an eye pattern analyzer to a Pulse Pattern Generator (PPG) in a bench top test setup.

FIG. 9 illustrates a connection of an eye pattern analyzer 2 to a Pulse Pattern Generator (PPG) 106 in a bench top test setup. The test setup shows connection of an electrical input to a CH1 electrical connection 30, and an external reference clock connection to a CLK In port 40 to eye pattern analyzer housing 2. Other possible connections to the PPG 106 are not shown. However, the test setup illustrates how connection of eye pattern analyzer 2 can simplify measurements since the display and statistical analysis of eye patterns provided by the analyzer 2 eliminate the need for more elaborate and more complex test equipment. This setup, thus, significantly reduces eye pattern bench top test system complexity.

III. Measurement Process

Figure 10:
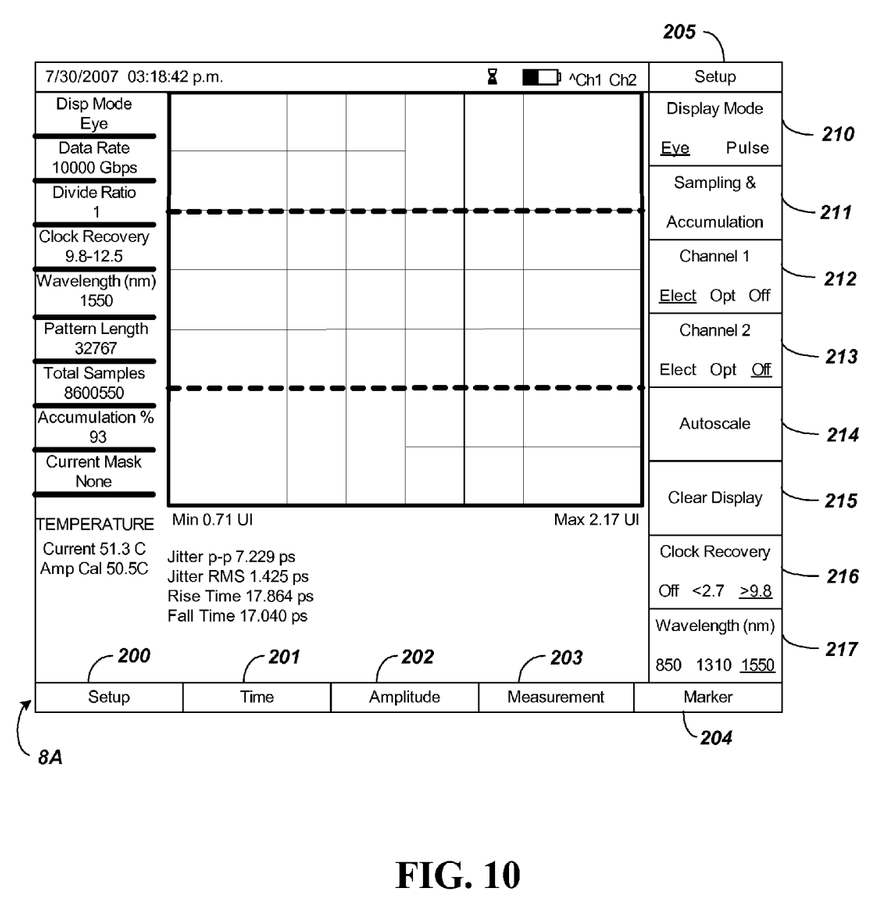
FIG. 10 shows a display configuration for setup of eye pattern or pulse measurements.

FIG. 10 shows a display configuration for setup of eye pattern or pulse measurements. The display shown is provided prior to accumulation of data. The hard key functions 8A are shown at the bottom of the display, and correspond with hard key buttons 8 on the housing shown in FIG. 1. Similarly, the soft key functions 10A are shown to the right of the display and correspond with soft key buttons 10 on the housing in FIG. 1. The characteristics of the graph are displayed to the left of the screen. The time and date, system in use hourglass, battery power available, and active test channel in use are displayed at the top of the screen.

The SETUP button activates the setup menu to start making an eye pattern measurement. The SETUP menu as selected is indicated in area 205. The setup menu allows setting the appropriate electrical connection channels, with connections for CH1 and CH2 being independently set. The DISPLAY MODE button 210 is set to eye for eye pattern, or pulse for pulse pattern (eye being selected in FIG. 10 as shown by the underline). The Sampling and Accumulation button 211 allows selection of how much data can be accumulated as described in more detail to follow. The Channel 1 key 212 and Channel 2 key 213 enable selection of an electrical or optical signal (in FIG. 10 CH1 is set to electrical, while CH2 is off). The Autoscale button 214 re-scales and centers the display. If any pattern remains on the screen from previous measurements, the clear display button 215 enables the screen to be refreshed. The Clock Recovery button 216 allows selection of two possible frequency bands for the clock if a reference clock is not available. The 9.8-12.5 GHz is selected as shown by the underline on the clock recovery key 216 on the right as well as the characteristics indicated on the left of the screen. Input signal wavelength is selected using Wavelength button 217 when an optical signal is being measured. The 1550 nm wavelength is selected as shown.

With the TIME hard button 201 selected, the Clock Rate can be set. The time menu is not shown in FIG. 10, only the setup menu. In the time menu, the soft key functions will be reset. The soft keys are then used to set the data rate for a recovered clock, or the clock rate and divide ratio for a reference clock. Details of the Time hard button 201 are described more with respect to FIG. 13

Before proceeding to make measurements, the Sampling & Accumulation soft button 211 is depressed. The system will then use one of three different ways to accumulate data before displaying. A default setting is for no accumulation where the display will be cleared and updated with every new set of sampled data. For an infinite setting, the sampled data are accumulated indefinitely until the sampling is halted by the user, and the accumulated data are displayed on the screen. An accumulated limits method allows setting an accumulation limit, such as a set number of seconds. Under all accumulation methods listed, the user can manually stop the sampling with a Run and Hold soft key.

Figure 11:
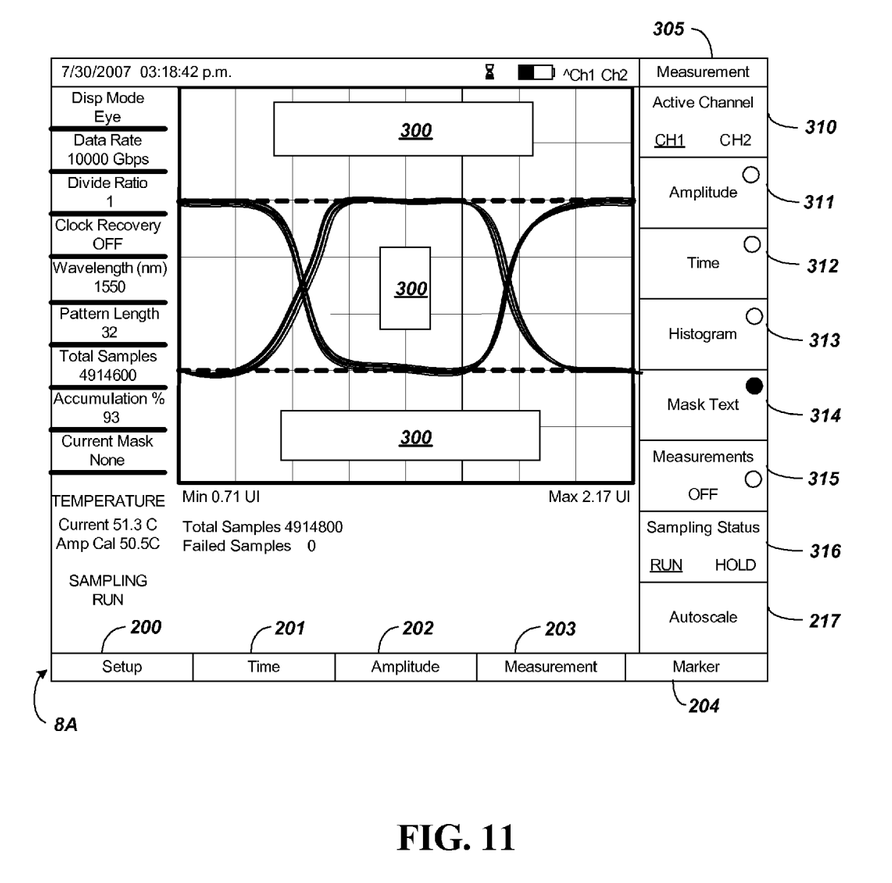
FIG. 11 shows a display configuration for measurement mode in a mask configuration.

With setup complete, measurements can be made by depressing the Measurement hard function key 203. This provides a measurement mode display as shown in FIG. 11 and as indicated by the measurement mode indication 305. FIG. 11 shows infinite accumulation of both Zero and One pulses in an eye pattern as selected by key 211 of FIG. 10. Initially, the Active Channel key 310 indicates the channel where measurements are being performed (here CH1). The Amplitude key 311 is selected to make eye pattern amplitude measurements. The following amplitude measurements are performed on the data in Amplitude mode: One Level, Zero Level, Eye Amplitude, Eye Height, Crossing % and SNR. The Amplitude key 311 is not selected as indicated by the circle not being filled in FIG. 11. The Time key 312 is selected to make time measurements on the active channel. The following time measurements are performed on the data: Jitter peak-to-peak, Jitter RMS, Rise Time, Fall Time, Eye Width and Duty Cycle Distortion. Selecting the Histogram key 313 enables selection of mean and standard deviation of specific portions of the eye pattern as shown in more detail in FIG. 12. Further, when the mask measurement key 314 is selected, one of several masks is displayed as described in more detail to follow. The mask text is selected as shown by the filled in circle in FIG. 11. Measurements Off button 315 turns all measurements off. Sampling status 316 indicates when sampling is occurring. When run is selected, the screen is cleared and sampling is started. Autoscale button 217 scales the screen to center the eye pattern.

Pulse pattern mode can be used instead of eye pattern by making the Pulse selection using button 210 instead of eye pattern in the Setup menu of FIG. 10. For pulse measurements, the total length of the pulse pattern should be entered in with the TIME menu selected with button 201 as described in more detail with respect to FIG. 13. For example with a $2^{15}-1$ PRBS pattern, the total length of 32767 can be entered. To view a particular sequence, the number of bits to display and the offset are entered in the TIME menu. For example to view bits 131 to 145 of a pattern the number of bits is set to 15 and the offset is set to 131. The Autoscale function of button 214 will not be available.

Histograms, masks and markers can be used to analyze the pulse pattern, as well as eye patterns. The mask pattern is illustrated in FIG. 11. The mask mode indicated at 305 is used to confirm that an eye pattern is within an industry standard shape. Several different masks can be selected. In some embodiments, a user can edit the masks. The display in the mask will show keep out areas 300 defined by the mask.

Figure 12:
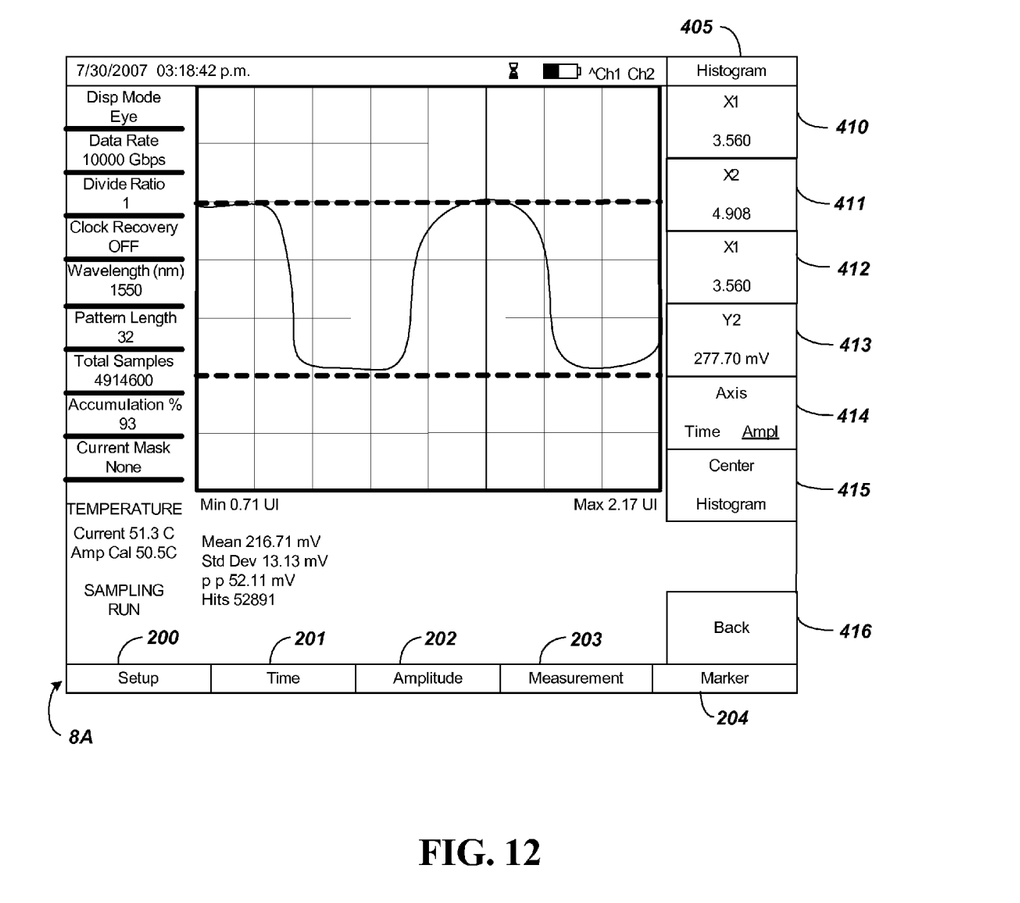
FIG. 12 shows a display configuration in a histogram mode displaying a pulse pattern rather than an eye pattern.

The histogram pattern is illustrated in FIG. 12. In the histogram mode statistical calculations are performed including calculation of the number of hits inside the window, the mean, standard deviation and peak-to-peak values for enclosed pixels. In the Histogram mode, keys X1 410 and X2 411 set the first and second x-axis coordinates for the histogram window. The numeric keypad 6, arrow keys 16 or knob 14 select the coordinates. The mode keys Y1 412 and Y2 413 set the first and second y-axis coordinates for the histogram window. The Axis button 414 enables selection of a time or an amplitude graph for viewing (here amplitude is selected). The Center Histogram button 415 centers the displayed signal within the boundaries of the display, and is particularly useful when the display is originally off screen. The Back button 416 returns operations to the measurement window.

Figure 13:
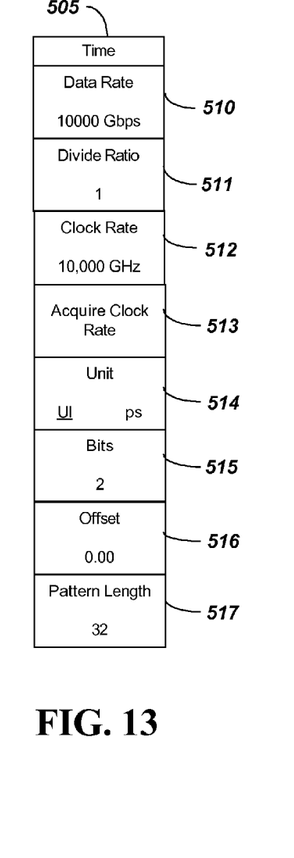
FIGS. 13-15 show soft keys for respective ones of the hard keys including time, amplitude and marker keys
Figure 14:
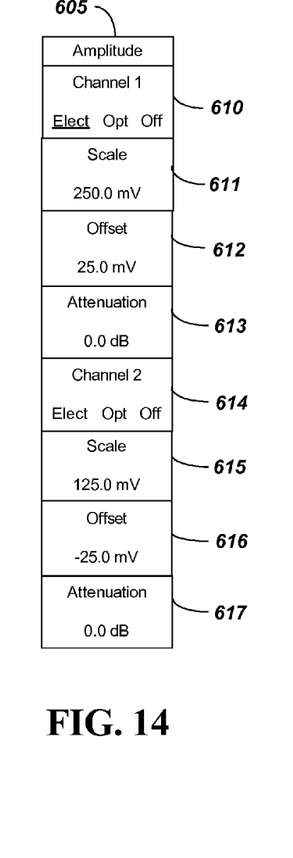
Figure 15:
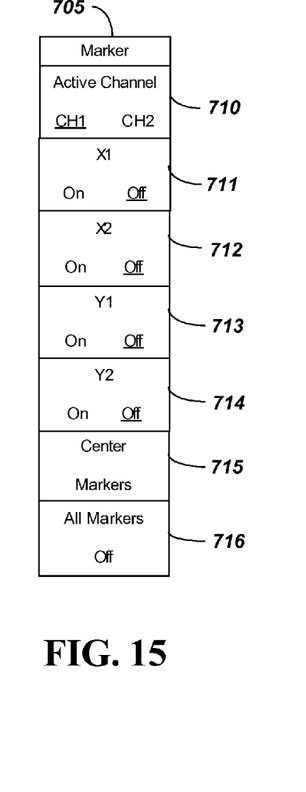

FIGS. 13-15 show soft keys 10 for respective ones of the hard keys 8, including time 201, amplitude 202 and 204 marker keys. The setup key 200 and measurement key 203 were previously described with respect to FIGS. 10 and 11.

FIG. 13 illustrates when the time hard key 201 is depressed. The time menu is displayed with marker field label 505 as shown in FIG. 13. The function of specific buttons in the marker menu shown in FIG. 13 are described as follows.

Data Rate 510: The data rate of the input signal can be entered by the user. Alternatively, the data rate can be automatically calculated by entering the clock rate and divide ratio.

Divide Ratio 511: Typically, the clock rate and the data rate are equal, so the divide ratio will be set to 1, which is the default value. If the divide ratio is different than 1, the user can enter the integer value.

Clock Rate 512: Instead of entering the data rate and divide ratio and having the clock rate calculate, button 512 enables a user to input the value directly.

Acquire Clock Rate 513: This button initiates an internal frequency counter 76 that can acquire the clock rate of the input signal. The result will be displayed with the clock rate button 512.

Unit 514: The units for the time axis can be set to picoseconds (ps) or unit intervals (UI).

Bits 515: This button sets the number of bits displayed on the screen. For example when the units are UI, setting the bits value to 2 will generate a time axis of 0.00 to 2.00 UI.

Offset 516: This button sets the horizontal shift applied to the display. Using the example for bits, with an offset of 1.5, the UI will now range from a minimum of 1.5 UI to 3.5 UI.

Pattern Length 517: If the length of the input repeating pulse pattern is known, this button is used to enter the value. For example commonly used PRBS data rates are: $2^{7}-1=127$ and $2^{9}-1=511$.

FIG. 14 illustrates when the amplitude hard key 202 is depressed. The amplitude menu is displayed with marker field label 605 as shown in FIG. 14. The function of specific buttons in the marker menu shown in FIG. 14 are described as follows.

Channel 1 (610): This button sets channel 1 (CH1) to have either electrical or optical inputs or to be turned off.

Scale 611: This button sets the scale of the amplitude axis for channel 1. With an electrical signal, scale will be in mV/div. With an optical signal, the scale will be uW/div.

Offset 612: This button sets the offset to the amplitude axis start from a zero for channel 1.

Attenuation 613: For input signals with amplitude levels greater than a specified input range, an external attenuator is set on the input port to a value large enough to bring channel 1 into the eye pattern analyzer range. The attenuation value is entered using button 613.

Channel 2 (614): This button sets channel 2 (CH2) to have either electrical or optical inputs or to be turned off.

Scale 615: This button sets the scale of the amplitude axis for channel 2. With an electrical signal, scale will be in mV/div. With an optical signal, the scale will be uW/div.

Offset 716: This button sets the offset to the amplitude axis start from a zero for channel 2.

Attenuation 617: For input signals with amplitude levels greater than a specified input range, an external attenuator is set on the input port to a value large enough to bring channel 2 into the eye pattern analyzer range. The attenuation value is entered using button 617.

FIG. 15 displays when the marker hard key 204 is depressed. The marker menu is displayed with marker field label 705 as shown in FIG. 15. The Marker hard key 204 allows markers to be turned on or off independently. The location of each marker and the distance between two markers in each plane are displayed at the top of the screen. The x-axis and y-axis markers can be used to measure the location and distance between any two points on the display. The function of specific buttons in the marker menu shown in FIG. 15 are described as follows.

Active Channel 710: This button sets either CH1 or CH2 as the active channel for marker measurements as well as other measurements.

X1 (711) and X2 (712): The X1 and X2 buttons turn each x-axis marker on or off. Once the marker is on, the user can enter a value for the coordinate of the marker, or the user can use the arrow keys 14 and knob 16 to adjust the marker coordinate value. The numerical location of each marker is displayed on the screen.

Y1 (713) and Y2 (714): The Y1 and Y2 buttons turn each y-axis marker on or off. Once the marker is on, the user can enter a value for the coordinate of the marker, or the user can use the arrow keys 14 and knob 16 to adjust the marker coordinate value. The numerical location of each marker is displayed on the screen.

Center Markers 715: This button is used to turn on all markers and have them centered in the middle of the display screen. If markers are initially off the screen, this makes it easier to adjust X and Y marker values.

All Markers Off 716: This button turns all of the markers off. The markers can, however, be turned off individually by using buttons such as X1 (711) or Y1 (713).

In one embodiment, the eye pattern analyzer uses internal calibration coefficients to ensure amplitude accuracy over a full range of input voltages. The calibration coefficients can be routinely updated. To identify when to perform a calibration, the current instrument temperature as well as temperature at the last amplitude calibration are displayed as shown in FIG. 10. With the difference in temperature above a threshold value a calibration is recommended. Although not shown, a calibration menu can be activated with a shift-2 key selection.

Calibration of the O/E module can further be performed to ensure optical measurements remain accurate with changing operating conditions. Two types of calibrations can be performed on the O/E module: power meter and dark level. Optical power is measured by dividing the measured DC current from the photo-diode by its responsivity value. For the power meter calibration, the current used in measuring the photo-current is calibrated over a range of input current values. For dark level, the eye pattern analyzer can be calibrated at the factory or by the user to remove the effect of residual dark level currents. These currents are present with no optical input into the O/E module and can produce an offset in the zero level. These currents can, thus, be calibrated out.

Further in the O/E module, the conversion gain can be adjusted in a calibration along with responsivity values. The conversion gain is used to calculate the optical input power (in watts) from the measured electrical output of the module (in volts). This conversion gain takes into account the gain of the photo diode and transimpedance amplifier of the O/E module. The conversion gain and responsivity values are determined in the factory and are stored in the internal memory of the eye pattern analyzer.

IV. Statistical Measurements

Data pattern samples are taken and the processor generates a 2-dimensional x-y database representing time (x-axis) and voltage (y-axis). As more samples are accumulated, the database grows in the third dimension, which represents the number of pixels that fall in the same x-y location on the display.

Statistical analysis is performed by using a histogram window to select a certain number of pixels of the display database. By calculating the mean and standard deviation of this select number of pixels, specific statistical measurements can be extracted. Below are described statistical measurements for amplitude and time.

A. Statistical Amplitude

At least six amplitude related statistical measurements can be performed by the eye pattern analyzer using a histogram amplitude axis (y-axis) including: One Level, Zero Level, eye height, eye amplitude, eye crossing percentage, and signal to noise ratio (SNR). For optical measurements, two additional statistical measurements that can be performed including extinction ratio and average power.

A definition of each of the amplitude statistical measurements are as follows:

One Level: The mean value of the top histogram distribution in the middle 20% of the eye generates the One level.

Zero Level: The mean value of the bottom histogram distribution in the middle 20% of the eye generates the Zero level.

Eye Amplitude: The difference between the One level and the Zero level generates the eye amplitude.

Eye Height: The eye height is calculated using the following equation: Eye Height=(One Level−3×Standard Deviation (One Level))−(Zero Level+3×Standard Deviation(Zero Level)).

Eye Crossing Percentage: Crossing percentage is a measure of the amplitude of the crossing points relative to the One Level and the Zero Level. To determine the eye crossing percentage, the One Level, Zero Level and crossing level must first be found. The crossing level is determined by taking the mean value of a thin vertical histogram window centered on the crossing point. The eye crossing percentage is calculated using the following equation: Crossing %=100× ((Crossing Level−Zero Level)/(One Level−Zero Level).

SNR: The signal to noise ratio is calculated using the following equation:

$$SNR = (One\ Level - Zero\ Level)/(Standard\ Deviation\ (One\ Level) + Standard\ Deviation(Zero\ Level)).$$

Extinction Ratio: The extinction ratio only applies to optical signals (measured in Watts) and is a measure of the ratio of the One Level to the Zero Level. In some embodiments a correction factor is applied to the extinction ratio result to account for the non-ideal frequency response characteristics of the O/E conversion module. This correction factor is dependent on the data rate of the input signal. The extinction ratio is calculated using the following equation: Extinction Ratio (dB)=10 $\log_{10}$[One Level/Zero Level]

Average Power: The average power measurement only applies to optical measurements. The average power level is derived from the average photodiode current and is not determined from the pixel database.

B. Statistical Time Measurements

At least six time related statistical measurements can be performed by the eye pattern analyzer using a histogram time axis (x-axis) including: peak-to-peak jitter, RMS jitter, rise time, fall time, eye width, and duty cycle distortion.

Peak to Peak Jitter and RMS Jitter: NRZ Jitter is the measure of the time variances of the rising and falling edges of an eye diagram as the edges affect the crossing points of the eye. To compute jitter, the amplitude of the crossing points of the eye are first determined. Then a vertically thin measurement window is placed horizontally through the crossing points, and a time histogram is generated. The histogram mean determines the center of the crossing points. The histograms are analyzed to determine the amount of jitter. Jitter is measured and displayed in either peak-to-peak or RMS formats. Peak-to-peak is determined from the full width of the histogram at the eye crossing point. RMS is determined from the histogram mean.

Rise Time: Rise time is the measure of the mean transition time of the data on the upward slope of an eye diagram. The Measure 20-80% rise time, a thin horizontal histogram slice is placed at the 20% level to the left of the eye crossing and at the 80% level to the right of the eye crossing. The Rise Time is then calculated using the following equation: Rise Time=Mean (80% time level)−Mean (20% time level).

Fall Time: Fall time is a measure of the mean transition time of the data on the downward slope of an eye diagram. Measuring fall times is similar, but in this case a thin horizontal histogram slice is placed at the 20% level to the right of the eye crossing and at the 80% level to the left of the eye crossing. The Fall Time is then calculated using the following equation: Fall Time=Mean(20% time level)−Mean(80% time level).

Eye Width: Eye width is a measure of the horizontal opening of an eye diagram. Eye width is calculated by first placing thin horizontal histograms at the two crossing points and then using the following equation: Eye Width=(Mean(crossing pt 2)−3×Std Dev(crossing pt 2))−(Mean(crossing pt 1)+3×Std Dev(crossing pt 1)).

Duty Cycle Distortion (DCD): Duty Cycle distortion is a measure of the time separation between the rising edge and falling edge at the 50% level of the eye diagram. To measure the DCD, the 50% level of the edges is calculated using the same histograms that are used in the Rise Time and Fall Time measurements (take the center of the 20% to 80% measurement). The DCD is then calculated using the following equation: DCD=100×[Time difference between rising and falling edges @50% level/Bit period].

The "Bit Master MP1026A Eye Pattern Analyzer User's Guide" available from Anritsu Company, Morgan Hill, Calif. is hereby incorporated by reference herein in its entirety.

Although the present invention has been described above with particularity, this was merely to teach one of ordinary skill in the art how to make and use the invention. Many additional modifications will fall within the scope of the invention, as that scope is defined by the following claims.

What is claimed:

1. An eye pattern analyzer circuit comprising:
   an instrument housing comprising:
      a keypad;
      a display;
      a first electrical port connection;
      a clock signal port;
      a sampler circuit having a first RF input connected to the first electrical port to receive a digital signal, a LO signal port, and a first IF port for providing a sampled output from the first RF input;
      a trigger circuit having an input connected to the clock input port and having an output connected to the LO signal port of the sampler;
      a signal processor connected to the first IF port, wherein the signal processor is configured to overlay signal portions forming a zero and a one from the digital signal from the first electrical port to form an eye pattern, perform a statistical analysis on the eye pattern, and provide the eye pattern and statistical analysis to the display based on inputs received from the keypad.

2. The eye pattern analyzer of claim 1, wherein the instrument housing further comprises a clock recovery unit (CRU) having a CRU input for receiving a signal provided to the first RF input of the sampler circuit, and a CRU output for providing a recovered clock signal to the input of the trigger circuit.

3. The eye pattern analyzer of claim 1, wherein the instrument housing further comprises an optical to electrical module having an input for receiving an optical signal and an output providing a converted electrical signal for connection to the first RF input of the sampler circuit.

4. The eye pattern analyzer of claim 1, further comprising an optical to electrical module external to the housing, the optical to electrical module having an input for receiving an optical signal and an output providing a converted electrical signal for connection to the first RF input of the sampler circuit.

5. The eye pattern analyzer of claim 1, wherein the sampler circuit further comprises a second RF input connected to the first electrical port, and a second IF port for providing a sampled signal to the signal processor.

6. The eye pattern analyzer of claim 1, wherein the statistical analysis comprises determining at least one of amplitude values for: One Level, Zero Level, eye height, eye amplitude, eye crossing percentage and signal to noise ratio.

7. The eye pattern analyzer of claim 3, wherein the statistical analysis comprises determining at least one of extinction ratio and average power.

8. The eye pattern analyzer of claim 1, wherein the statistical analysis comprises determining at least one of time values for: peak-to-peak jitter, RMS jitter, rise time, fall time, eye width, and duty cycle distortion.

9. The eye pattern analyzer of claim 1, wherein the signal processor comprises:
   a Field Programmable Gate Array (FPGA) configured to receive and process the digital signal from the first IF port to provide the sampled output; and
   a central processing unit (CPU) receiving the sampled output from the FPGA and performing the statistical analysis on the eye pattern, and providing the eye pattern and statistical analysis to the display based on inputs received from the keypad.

10. The eye pattern analyzer of claim 9, wherein the CPU is provided on a separate printed circuit board (PCB) from the FPGA.

11. The eye pattern analyzer of claim 10, wherein the FPGA is provided on a common PCB with the sampler and the trigger circuit, and wherein the sampler is a dual sampler capable of receiving and sampling two separate electrical signals.

12. The eye pattern analyzer of claim 9, wherein the CPU is configured to connect to a personal computer and to provide the eye pattern and statistical analysis for display on the personal computer.

13. An eye pattern analyzer circuit comprising:
   an instrument housing comprising:
      a keypad;
      a display;
      a first electrical port connection;
      a clock signal port;
      a sampler circuit having a first RF input connected to the first electrical port, a LO signal port, and a first IF port for providing a sampled output from the first RF input;

a trigger circuit having an input connected to the clock input port and having an output connected to the LO signal port of the sampler;

a signal processor connected to the first IF port, wherein the signal processor is configured to provide at least one of a One pulse and a Zero pulse that can be overlaid to form an eye pattern, and to perform a statistical analysis on the at least one pulse and provide the at least one pulse and the statistical analysis result to the display.

14. The eye pattern analyzer of claim 13, wherein the statistical analysis comprises determining at least one of amplitude values for: One Level, Zero Level, eye height, eye amplitude, eye crossing percentage and signal to noise ratio.

15. The eye pattern analyzer of claim 13, wherein the statistical analysis comprises determining at least one of extinction ratio and average power.

16. The eye pattern analyzer of claim 1, wherein the statistical analysis comprises determining at least one of time values for: peak-to-peak jitter, Root-Mean-Square (RMS) jitter, rise time, fall time, eye width, and duty cycle distortion.

17. A method for analyzing a digital signal comprising:
sampling a digital signal;
overlaying signal portions forming a zero and a one from the digital signal to form an eye pattern;
analyzing statistics for the eye pattern including at least one of the following values: eye height, eye amplitude, and eye crossing percentage; and
providing the analyzed statistics to a display.

18. The method of claim 17, wherein the step of analyzing statistics further comprises at least one of the values: rise time, fall time and eye width.

19. The method of claim 17, further comprising:
allowing user selection of a histogram sampling window for the digital signal;
determining a mean and a standard deviation for at least one portion of the eye pattern within the histogram sampling window.

20. The method of claim 17, further comprising:
providing a Pseudo Random Bit Sequence (PRBS) signal to a component generating the digital signal;
determining a length of the repeating pulse pattern in the digital signal based on the PRBS signal; and
allowing user selection of bits within the repeating pulse pattern for the analysis step.

* * * * *